United States Patent
Bishop

[15] 3,680,090
[45] July 25, 1972

[54] NON-MAIN BEAM REFLECTED IFF INTERROGATION REJECTOR

[72] Inventor: Walton B. Bishop, Oxon Hill, Md.
[73] Assignee: The United States of America as represented by the Secretary of the Navy
[22] Filed: July 27, 1970
[21] Appl. No.: 58,321

[52] U.S. Cl. .............................................. 343/6.5 LC
[51] Int. Cl. ......................................... G01s 9/56
[58] Field of Search ..................... 343/6.5 R, 6.5 LC

[56] References Cited

UNITED STATES PATENTS 2,962,713  11/1960  Harris et al. .................... 343/6.5 R X
2,966,675  12/1960  Smoll ................................. 343/6.5 R
3,213,446  10/1965  Voyner .............................. 343/6.5 R
3,349,402  10/1967  Foster ............................ 343/6.5 R X Primary Examiner—T. H. Tubbesing
Attorney—R. S. Sciascia, Arthur L. Branning, J. G. Murray and Sol Sheinbein

[57] ABSTRACT

A technique of utilizing the measured time between reception of a sidelobe suppression signal and reflected signals of an IFF interrogation to inhibit further responses to succeeding reflected path interrogations.

7 Claims, 3 Drawing Figures

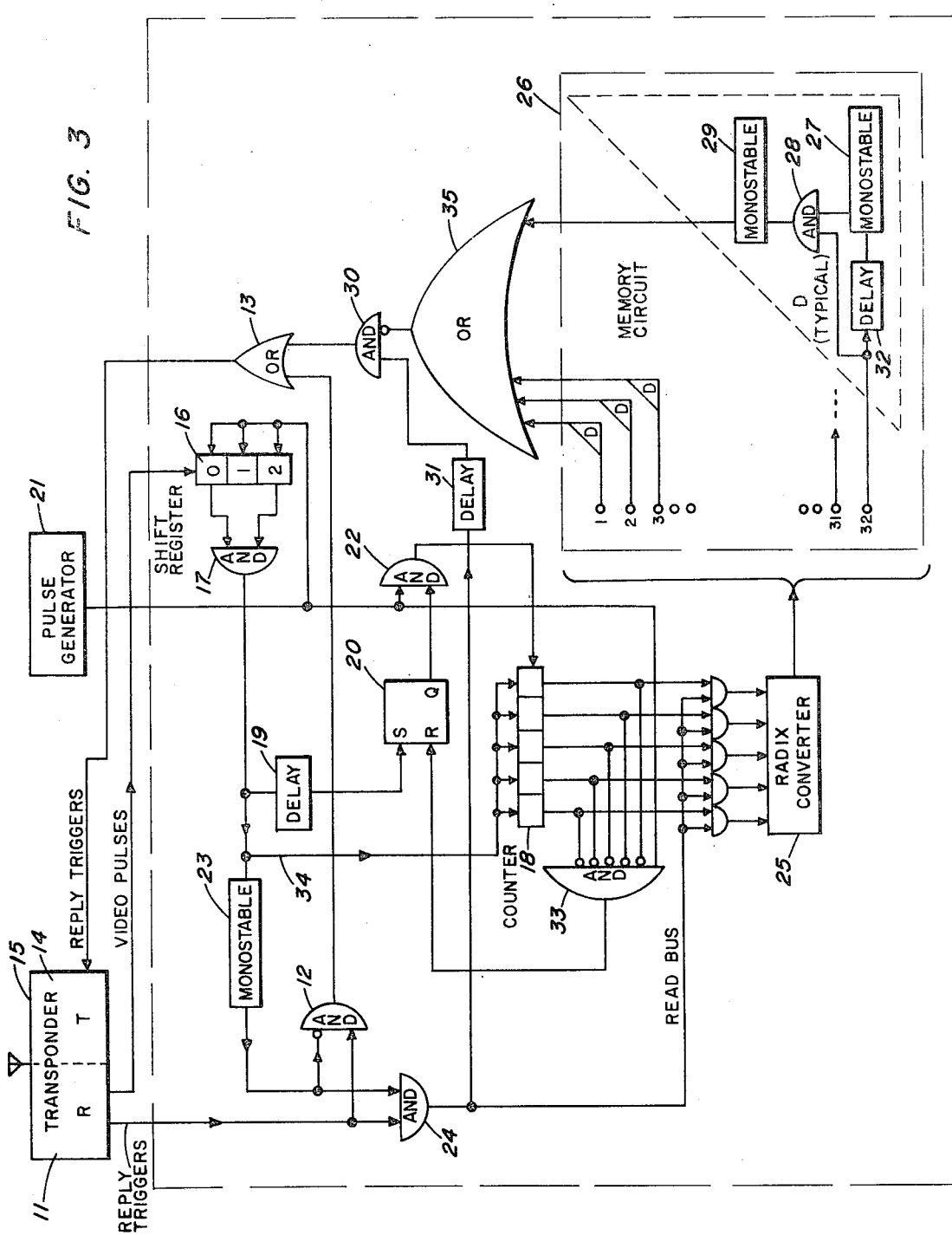

NON-MAIN BEAM REFLECTED IFF INTERROGATION REJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a suppression network for use in a transponder receiving interrogation signals.

An interrogation transmitter system, when utilized with a transponder, transmits a coded signal consisting of a train of timewise spaced pulses. The coded signal generated by the interrogation system is received by the transponder and analyzed. If the pulses are of the correct frequency, amplitude and spacing, an output signal will be produced by the transponder. The interrogation system may, for example, be positioned on the ground while the transponder may be mounted in an aircraft and be utilized for identification purposes or for deriving other information such as altitude or bearing of the aircraft.

Since the transponder is triggered, or caused to transmit a reply, in response to interrogation coded signals, care must be taken to prevent false, or spurious triggering of the transponder. Such undesired triggering of the transponder is usually caused by a coded pulse train signal from a side lobe of the radiating antenna of the interrogation system. Another cause for undesired triggering has been known to occur due to echoes or reflected signals.

Current interrogation friend or foe (IFF) transponders include a suppression network to prevent triggering of the transponder due to reflected signals. The suppression period, usually 75 to 125 microseconds, that follows each reception of an interrogation causes the transponder to reject all interrogations during that period when actually, only the reflected signals should be rejected.

Since all interrogations on any particular mode are essentially identical, regardless of their source or time of occurrence, it is not possible to code them so that a reflected signal can be recognized as being the same as the one just previously received.

A technique for preventing such reflected interrogations from triggering the transponder without suppressing the transponder for such a long period of time is taught and claimed in copending patent application of Walton B. Bishop, Ser. No. 22,467, filed Mar. 25, 1970.

A second type of reflected interrogation which may cause trouble follows a path to a transponder that is outside the interrogator antenna's main beam. Transponders now in use aboard aircraft reduce the effect of these reflected interrogations by suppressing all transponder decoders for about 35 microseconds immediately after receiving a sidelobe suppression signal. Even though the ISLS periods are only about 35 $\mu$sec long, analyses have shown that they can be a serious reliability-reducing factor in those environments where large numbers of interrogators are operating. The reliability reduction could become particularly serious if large numbers of interrogator sites use the "Improved" ISLS now advocated by the Federal Aviation Administration unless firm controls over transmitter power are exercised. There is also a good possibility that the 35 $\mu$sec suppression time now being used will not be long enough to prevent responses to non-main-beam reflected interrogations when air traffic becomes more dense. Unfortunately, the technique described in aforementioned patent application, Ser. No. 22,467 cannot be used to reject interrogations reaching a transponder outside the main beam.

The suppression of interrogator antenna sidelobes is essential for the operation of current radar beacon systems in order to provide adequate traffic capacity and azimuth discrimination. Also, the number of false targets continues to increase as the number of users increases and more buildings are constructed near interrogation sites. Consequently, a means of overcoming the effects of interrogation reflections without affecting the current sidelobe suppression capability is urgently needed.

It has long been recognized that the use of long suppression periods to overcome reflections is wasteful, since it denies utilization of the transponder to other direct path interrogations that may arrive from other interrogators during the suppression period, but no satisfactory alternative could be found.

SUMMARY OF THE INVENTION

The general purpose of the invention is to provide an improved suppression network to be used in an IFF system. Logic circuitry is disclosed that measures the time between reception of a two pulse sidelobe suppression signal and the arrival of the first reflected interrogation signal, and then utilizes this time to reject succeeding reflected interrogations from the same source, without affecting the manner in which responses are made to main-beam interrogations.

OBJECTS OF THE INVENTION

It is therefore an object of the present invention to provide a transponder having an improved suppression network.

Another object of the present invention is to provide a transponder capable of recognizing reflected signals.

A further object of the present invention is to provide a transponder operable without long suppression periods.

A still further object of the present invention is to provide an IFF transponder capable of responding to more valid interrogations.

Yet another object of the present invention is to increase the traffic capacity and reliability of current IFF systems.

A still further object of the present invention is to provide a way to prevent reflected IFF interrogations from eliciting responses from transponders without turning the transponders off.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a block diagram of the suppression network for reflected IFF interrogations not in the main beam of the interrogating antenna.

DESCRIPTION OF THE PREFERRED EMBODIMENT

Figure 1:
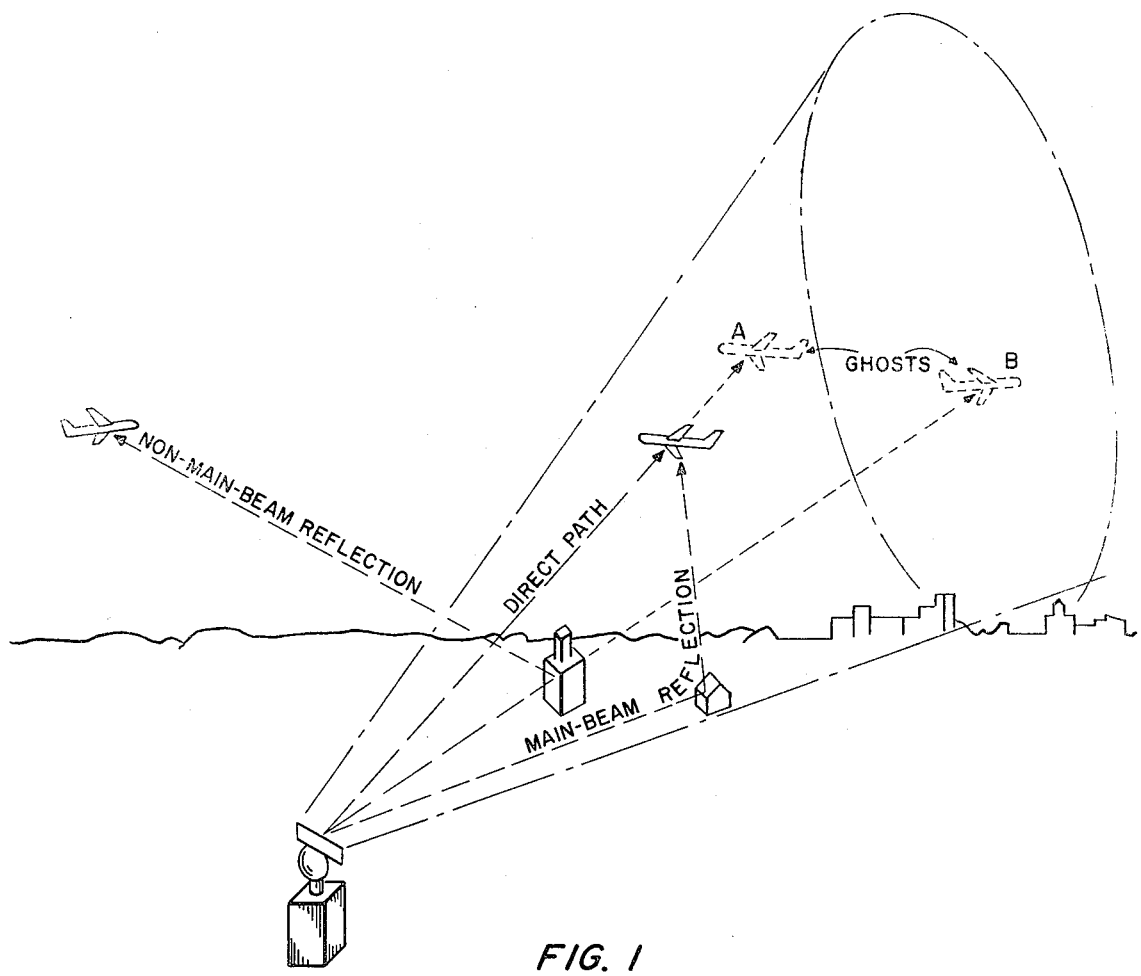
FIG. 1 is a pictorial representation in which way IFF interrogations produce undesired transponder triggering.

There are two types of reflected interrogations that interfere with the operation of radar beacons. The most common type follows a path that is entirely within the main beam of the interrogator antenna. The Main-Beam Reflection shown in FIG. 1 is of this type. When the geometry of interrogator-responsor, reflector, and transponder becomes as shown in FIG. 1, not just one, but many, reflected interrogations reach the transponder. In fact, such reflected interrogations will continue to reach the transponder until the interrogator antenna's main beam has moved off of the target (or the target has moved out of the main beam). Normally, as long as current equipment and interrogation repetition frequencies are used, each time a reflected interrogation reaches a transponder, about 30 to 40 more follow. Efforts to reduce interrogation repetition frequencies should eventually reduce this number to something less than 20, but this will not change the reflected-interrogation problem. When main-beam reflected interrogations occur as shown in FIG. 1, a false target, or ghost, as shown at position A will appear in line with the real target and at a greater range. The range difference between real and false target will be equal to the difference between the lengths of the direct-path and the indirect- or reflected path between interrogator and transponder.

Transponders now in use throughout the United States and Europe reduce the effect of reflected interrogations by suppressing all transponder interrogations for about 125 μsec immediately after receipt of a main-beam interrogation. This suppression serves to deny a response to any interrogation arriving via a reflected path, but it also denies responses to other direct-path interrogations that may arrive from other interrogators during this time interval.

A technique for preventing such reflected IFF interrogations from triggering an aircraft transponder without having this long suppression period is taught and claimed in copending patent application of Walton B. Bishop, Ser. No. 22,467, filed Mar. 25, 1970. That patent application describes a technique for overcoming the effect of IFF interrogation reflections whose entire path is within the main beam of the interrogator antenna. The technique consists of measuring the time between arrival of the direct-path and the first indirect-path interrogations, and then using this information to reject succeeding indirect-path interrogations of the same delay. It thus eliminates the need for the long (125 μsec) transponder decoder suppression periods that follow reception of a valid interrogation.

The second type of reflected interrogations that may cause trouble follows a path to a transponder that is outside of the interrogator antenna's main beam. The non-main-beam reflection shown in FIG. 1 is of this type. These reflections persist for essentially the same length of time as the main-beam reflected interrogations. They also produce ghosts, but their ghosts are in line with the reflecting object rather than with any transponder. The ghost labeled B in FIG. 1 is typical.

The transponders now in use throughout the United States and Europe reduce the effect of reflected interrogations by suppressing all transponder interrogation decoders for about 35 Ξsec (35 ± 10) immediately after receiving a side-lobe interrogation. Recently, the Federal Aviation Administration has started equipping its interrogators with an "Improved" Interrogation Side Lobe Suppression (ISLS) technique that will cause all transponders within range but not in the main beam to be suppressed for about 35 μsec each time an interrogation is transmitted. This is accomplished by transmitting two pulses omnidirectionally, instead of the single pulse now transmitted for ISLS. The prime purpose of this change is to suppress reflected interrogations that reach transponders located outside of both interrogator antenna main beams and sidelobes.

Reflected interrogations that reach transponders outside of the interrogator antenna's main beam can be rejected by a technique quite similar to that described in patent application, Ser. No. 22,467 for rejecting reflected interrogations that reach transponders in the main beam. The time between arrival of a two-pulse sidelobe suppression signal and arrival of the first reflected interrogation can be measured, and then this time can be used to reject succeeding reflected interrogations from the same source until the geometry of reflection changes.

Figure 2:
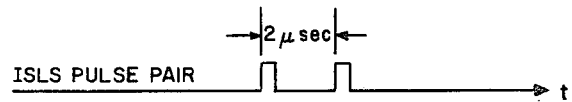
FIG. 2 is a time plot of the sidelobe suppression signal.

Interrogation Side Lobe Suppression Signals consist of a pair of pulses separated by 2 μsec as shown in FIG. 2. This pair of pulses may arrive alone where no sidelobe exists if the "Improved" ISLS is used. Otherwise, they will be followed by a third pulse spaced from the pulse pair for the particular mode of interrogation being used. (The standard ISLS technique puts only a single pulse in areas where there are no sidelobes.) In all cases, reception of two pulses spaced 2 μsec apart causes a current transponder's decoder to be suppressed for 35 ± 10 μsec.

Transponders within the interrogating antenna's main beam are incapable of receiving the second of the 2 μsec spaced pulses and thus their decoders are not suppressed for this period of time.

Referring now to FIG. 3, there is shown the Non-Main-Beam Reflected-Interrogation Rejector. As evident, this circuit has no effect upon operation of the transponder 15 when main-bean interrogations (without ISLS pulse pairs) are received. The reply triggers from the transponder receiver 11 pass through AND gate 12 and OR gate 13 to the transmitter 14.

When a pair of pulses spaced 2 μsec apart (an ISLS pair as shown in FIG. 2) are received, however, they will produce two outputs from stages 0 and 2 of the shift register 16 which shifts at a 1 MHz and hence AND gate 17 will be enabled and produce a pulse. This pulse does three things: (1) It sets the counter 18 to zero if the counter is not already in that state. (2) After a very short delay produced by delay 19 it sets switch 20 which causes an output on lead Q, thus allowing pulses from the continuously running pulse generator 21 to pass through AND gate 22 to the counter 18. Pulse generator 21 operates at the 1 MHz rate for simplicity, although other rates could be used as well. The five-stage digital counter 18 will count up to 32 and then stop automatically at the all-zero state. (3) The pulse from AND gate 17 will also cause monostable switch 23 to generate a gate equal to or slightly larger than the time required for the counter to complete a full cycle (32 μsec in this example).

The 32 μsec gate from monostable switch 23 will inhibit AND gate 12 so that no reply triggers can pass through it and simultaneously it will provide one input to AND gate 24 so that reply triggers will pass through it. If a reflected interrogation arrives during the 32 μsec gate, the reply trigger it produces will read the binary number from the counter 18 into the radix converter 25 and thus cause a pulse to enter the lead in the memory circuit 26 that corresponds to this number. The first pulse into a D-circuit in memory circuit 26 will cause monostable switch 27 (after a slight delay in delay 32) to produce a gate which provides one input to AND gate 28 so that the next pulse will produce an output to OR gate 35. The gate from monostable switch 23 lasts for a length of time slightly greater than the time it takes an interrogator antenna to scan past a reflecting object, essentially the same length of time it takes the antenna to scan past a responding target. However, there will be no output from AND gate 28 until a second pulse enters the same D-circuit. A second, third, fourth, etc. pulse will enter this same D-circuit, if-and-only-if, succeeding ISLS pulse pairs are followed by reflected interrogations having the same delay as the one which activated monostable switch 27.

Long before an ensuing ISLS pulse pair arrives, counter 18 will reach the "all-zero" stage and reset switch 20 through AND gate 33. Upon reception of the next ISLS pulse pair, switch 20 will cause counter 18 to start counting again, and if a reflected main beam signal arrives at the transponder at the same spacing from the ISLS pulse pair as the first reflected interrogation, it will find the counter 18 in the same state — thus the same number read by radix converter 25 and the same lead corresponding to this number in memory circuit 26 enabled, and thus AND gate 28 is enabled. Each time a reflected interrogation produces an output from AND gate 28, monostable switch 29 produces a short gate that acts through OR gate 35 to inhibit AND gate 30. Reply triggers from all but the first reflected interrogation from any object are thus rejected. Note that delay 31 serves only to delay the reply triggers enough to allow the inhibit gate to be effective on gate 30.

FIG. 3 includes a special feature, considered unnecessary for main-beam reflections, that will cause the gate from monostable switch 23 to be regenerated any time that a second ISLS pulse pair is received before the 32 μsec interval following the first ISLS pair has elapsed. When such an ISLS pulse pair is received, the pulse from AND gate 17 resets the counter 18 via lead 34 and thus will allow a second reply trigger from reflected interrogations in the process of being rejected to pass through AND gate 30. The regenerated gate from monostable switch 23 however will then continue to reject reflected interrogations for a full 32 μsec.

The counter 18 of FIG. 3 shows only five stages so that it will provide reflected-interrogation rejection equivalent to that now required by the specification which calls for a 35 ±

10 μsec suppression gate following reception of an ISLS pulse pair. If a longer gate is required to reject main-beam reflected interrogations, a longer gate should be used to reject non-main-beam ones. A six stage counter corresponding to a 64 μsec gate may be used. If the counter 18 is only capable of counting to 32 it is not possible for two reflections of the same interrogation to trigger a response. If the counter is made to count to as high as 64, then the circuit of FIG. 3 can handle multiple reflections of an interrogation.

The technique described above can be used whether the sidelobe suppression signals are accompanied by direct-path interrogations or not when the "Improved" ISLS technique is used, i.e., when the pulse pairs are transmitted omnidirectionally. Hence, all but the first non-main-beam reflected interrogation that could at present produce a false target can be rejected in all regions where either a sidelobe interrogation and a standard ISLS pulse are both received or "Improved" ISLS signals alone can be detected. Minor modifications to the circuit disclosed in FIG. 3, obvious to those skilled in the art, would be necessary when the classified military interrogation mode is in operation.

It should be noted that the reflection rejector of FIG. 3 disclosed will also reject all but one of the valid interrogations from all but one of two or more interrogators operating at interrogation repetition periods that differ by less than 1 microsecond any time that such interrogators interrogate a particular transponder simultaneously. Interrogation frequency assignments make this situation extremely unlikely.

The use of this reflected IFF interrogation reflector would permit transponders to answer many valid interrogations that now fail to be answered because of the long suppression periods. This would serve to increase the number of interrogators that could use the IFF system simultaneously without experiencing mutual interference and would automatically increase the system's reliability and anti-jam capability. The fact that transponder transmitter duty cycles might be increased momentarily should not be a problem, since the automatic overload control (AOC) circuit protects the transmitters from overloading. Very few valid interrogations would be rejected by the one microsecond suppression intervals, associated with reflected interrogations, in the memory circuits.

It is quite likely that a number of simplifications are feasible. It might be possible, for example, to reduce the counting rate of the counter and thus reduce the number of D-circuits required. Good systems engineering and circuit design should provide a number of other simplifications. It is believed, however, that this approach of suppressing only the reflections that actually reach a transponder offers the possibility of considerable improvement in transponder operation. The same approach should be applicable to certain other electronic systems that provide navigation and/or communications information.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a transponder receiving IFF interrogation signals and emitting reply signals, a suppression network for suppressing reply signals for reflected interrogation signals comprising:
   means for determining the time interval between said reflected interrogation signal and a side lobe suppression signal comprising two pulses separated by a predetermined time interval;
   storage means for storing said determined time interval; and
   means for suppressing ensuing transponder reply signals time separated from a sidelobe suppression signal by said stored time interval.

2. A suppression network as recited in claim 1, wherein said determining means comprises a shift register, a first and second coincidence means, a counter, a free running pulse generator and a switch, wherein said sidelobe suppression signal sets said shift register to produce an output from said first coincidence means whereby said switch produces a continuous output to one input of said second coincidence means, the other input of said second coincidence means being supplied by said pulse generator, the output signal of said second coincidence means initiating said counter, said reply signal transferring the count in said counter at that instant into said storage means.

3. A suppression network as recited in claim 2 including a third coincidence means connected between said counter and switch for resetting said switch upon said counter reaching a predetermined count.

4. A suppression network as recited in claim 3 wherein said suppressing means comprises:
   means for delaying said reply signal; and
   fourth coincidence means for receiving said delayed reply signal and an indicating means signal, said fourth coincidence means passing a signal if said indicating means indicates no two counts stored in said storage means are identical.

5. A suppression network as recited in claim 4 wherein said indicating means comprises:
   delay means for delaying a first count signal a predetermined time;
   fifth coincidence means for receiving said delayed count signal and an ensuing identical count signal, said fifth coincidence means output signal suppressing said fourth coincidence means.

6. In a transponder receiving IFF interrogation signals and emitting reply signals, the network comprising:
   indicating means for indicating the nonpresence of a sidelobe suppression signal comprising two pulses separated by a predetermined time interval;
   first coincidence means connected to said indicating means and said transponder receiver for triggering said transponder transmitter upon receiving a reply signal and said indicating signal.

7. The network of claim 6, wherein said indicating means comprises:
   a shift register,
   second coincidence means connected to said shift register for indicating the presence of said sidelobe suppression signal in said shift register; and
   an inverter connected between said first and second coincidence means.

* * * * *